(12) United States Patent
Sakaguchi

(10) Patent No.: US 8,820,469 B2
(45) Date of Patent: Sep. 2, 2014

(54) ELECTRIC POWER STEERING APPARATUS

(75) Inventor: Toru Sakaguchi, Gunma (JP)

(73) Assignee: NSK Ltd., Tokyo (JP)

(*) Notice: Subject to any disclaimer, the term of this patent is extended or adjusted under 35 U.S.C. 154(b) by 144 days.

(21) Appl. No.: 13/058,733

(22) PCT Filed: Sep. 9, 2010

(86) PCT No.: PCT/JP2010/065507
§ 371 (c)(1),
(2), (4) Date: Feb. 22, 2011

(87) PCT Pub. No.: WO2011/037019
PCT Pub. Date: Mar. 31, 2011

(65) Prior Publication Data
US 2012/0175183 A1   Jul. 12, 2012

(30) Foreign Application Priority Data

Sep. 28, 2009  (JP) ................ 2009-221792

(51) Int. Cl.
*B62D 5/04* (2006.01)

(52) U.S. Cl.
CPC ................... *B62D 5/0472* (2013.01)
USPC ........... 180/402; 180/403; 180/446; 180/444; 180/443; 701/41; 701/42; 701/43

(58) Field of Classification Search
USPC ........... 180/446, 402, 403, 444, 443; 701/41, 701/42, 43
See application file for complete search history.

(56) References Cited

U.S. PATENT DOCUMENTS

| | | | | |
|---|---|---|---|---|
| 5,473,231 A * | 12/1995 | McLaughlin et al. | ........ | 318/433 |
| 5,473,539 A * | 12/1995 | Shimizu et al. | ................ | 701/41 |
| 5,704,446 A * | 1/1998 | Chandy et al. | ................ | 180/446 |
| 6,742,620 B2 * | 6/2004 | Eidam et al. | .................. | 180/446 |
| 7,066,295 B2 * | 6/2006 | Ohta et al. | .................... | 180/422 |
| 7,188,701 B2 * | 3/2007 | Patankar | ....................... | 180/446 |
| 7,742,858 B2 * | 6/2010 | Tamaizumi | ..................... | 701/41 |
| 7,826,950 B2 * | 11/2010 | Tamaizumi et al. | ............ | 701/42 |
| 8,050,825 B2 * | 11/2011 | Ikeda et al. | ..................... | 701/42 |
| 8,269,443 B2 * | 9/2012 | Imai | ........................ | 318/400.23 |
| 2006/0162989 A1 * | 7/2006 | Yamada | ........................ | 180/444 |
| 2007/0120511 A1 | 5/2007 | Kobayashi et al. | | |
| 2008/0033613 A1 * | 2/2008 | Tamaizumi et al. | ............ | 701/41 |
| 2009/0192679 A1 * | 7/2009 | Kobayashi et al. | ............. | 701/42 |

FOREIGN PATENT DOCUMENTS

| | | |
|---|---|---|
| JP | 8-290778 A | 11/1996 |
| JP | 2002-145075 A | 5/2002 |
| JP | 2002-161969 A | 6/2002 |
| JP | 2002-369565 A | 12/2002 |

(Continued)

OTHER PUBLICATIONS

International Preliminary Report PCT/JP2010/065507; Apr. 19, 2012.

*Primary Examiner* — Joseph M Rocca
*Assistant Examiner* — Marlon Arce
(74) *Attorney, Agent, or Firm* — Sughrue Mion, PLLC

(57) ABSTRACT

An electric power steering apparatus that is capable of obtaining a more safe and comfortable handling performance by signal processing of road information and disturbances is performed to realize easy tuning, and vibration absorption level for brake is improved by a filter and a gain unit considering a frequency characteristic and a decelerating acceleration.

10 Claims, 14 Drawing Sheets

(56) References Cited

FOREIGN PATENT DOCUMENTS

| JP | 2005-297807 A | 10/2005 |
| JP | 2006-199219 A | 8/2006 |
| JP | 2007-84006 A | 4/2007 |
| JP | 2007-186064 A | 7/2007 |
| JP | 2008-018825 A | 1/2008 |
| WO | 2005/058672 A1 | 6/2005 |

* cited by examiner

PRIOR ART

PRIOR ART

PRIOR ART

PRIOR ART

ELECTRIC POWER STEERING APPARATUS

CROSS REFERENCE TO RELATED APPLICATIONS

This application is a National Stage of International Application No. PCT/JP2010/065507 filed Sep. 9, 2010, claiming priority based on Japanese Patent Application No. 2009-221792 filed Sep. 28, 2009, the contents of all of which are incorporated herein by reference in their entirety.

TECHNICAL FIELD

The present invention relates to an electric power steering apparatus that provides a steering system of a vehicle with a steering assist force by a motor, and in particular to an electric power steering apparatus that is capable of obtaining a more safe and comfortable handling performance by performing a signal processing based on a decelerating acceleration in a frequency band of disturbances to be removed from a reaction force and improving a vibration absorption level for brake.

BACKGROUND ART

In general, an electric power steering apparatus which energizes a steering apparatus of a vehicle by using a rotational torque of a motor as an assist torque, applies a driving force of the motor as the assist torque to a steering shaft or a rack shaft by means of a transmission mechanism such as gears or a belt through a reduction mechanism. In order to accurately generate the assist torque (a steering assist torque), such a conventional electric power steering apparatus (EPS) performs a feedback control of a motor current. The feedback control adjusts a voltage supplied to the motor so that a difference between a current command value and a motor current becomes small or zero, and the adjustment of the voltage applied to the motor is generally performed by an adjustment of a duty ratio of a PWM (Pulse Width Modulation) control.

Here, a general configuration of an electric power steering apparatus will be described with reference to FIG. 1. A column shaft 2 connected to a steering wheel (handle) 1 is connected to tie rods 6 of steered wheels through reduction gears 3, an intermediate shaft 4 including universal joints 4a and 4b, and a rack and pinion mechanism 5. The column shaft 2 is provided with a torque sensor 10 for detecting a steering torque of the steering wheel 1, and a motor 20 for assisting the steering force of the steering wheel 1 is connected to the column shaft 2 through the reduction gears 3. Electric power is supplied to a control unit 100 for controlling the electric power steering apparatus from a battery 14, and an ignition signal is inputted into the control unit 100 through an ignition key 11. The control unit 100 calculates a current command value I of an assist command based on a torque signal (a steering torque) Tr detected by the torque sensor 10 and a velocity signal Vel detected by a velocity sensor 12, and controls the motor 20 based on the calculated current command value I through a motor driving unit 21. A voltage Vm applied between motor terminals of the motor 20 and the motor current i are measured and inputted into the control unit 100.

In such the electric power steering apparatus, heretofore, for example as disclosed in Japanese Patent Application Laid-open No. H8-290778 (Patent Document 1), by means of a robust stabilizing compensation section within the control unit 100, stability of the system and sensitivity characteristics of a road information and a disturbance information are simultaneously designed.

However, in such the conventional control device, since a reaction force during steering in the vicinity of a steering neutral point is small, it is difficult to accurately transmit the road information to a driver due to the effect of friction. Further, in the conventional electric power steering apparatus, it is difficult to set a hysteresis characteristic between a steering angle and a steering force to a characteristic at the same level as a hydraulic power steering apparatus.

As an apparatus to solve such a problem, there is an apparatus disclosed in Japanese Patent Application Laid-open No. 2002-369565 (Patent Document 2).

The outline of the apparatus disclosed in Patent Document 2 will be described with reference to FIG. 2 corresponding to FIG. 1. The motor 20 for generating an assist torque of a steering apparatus is driven by a motor driving unit 21, the motor driving unit 21 is controlled by a current command value I from the control unit 100 indicated by a dashed-two dotted line, and the torque signal Tr from the torque sensor and the velocity signal Vel from a velocity detecting system are inputted into the control unit 100.

The control unit 100 comprises a torque system control section 110 indicated by a dashed line that performs a control by using the torque signal Tr and a motor system control section 120 indicated by a dashed-dotted line that performs a control relating to driving of the motor 20. The torque system control section 110 comprises an assist amount calculating section 111, a differential control section 112, a yaw rate convergence control section 113, a robust stabilizing compensation section 114 and a self aligning torque (SAT) estimating feedback section 115A, and further includes adding sections 116A, 116B and a subtracting section 116C. Further, the motor system control section 120 comprises a compensation section 121, a disturbance estimating section 122, a motor angular speed estimating section 123, a motor angular acceleration estimating section (a differential section) 124 and a motor characteristic compensation section 125, and further includes adding sections 126A, 126B.

The torque signal Tr is inputted into the assist amount calculating section 111, the differential control section 112, the yaw rate convergence control section 113 and the SAT estimating feedback section 115A, all of them input the velocity signal Vel as a parameter. The assist amount calculating section 111 calculates an assist torque amount based on the torque signal Tr. The yaw rate convergence control section 113 inputs the torque signal Tr and a motor angular speed ω and brakes a movement that the steering wheel whirls in order to improve the convergence of yaw of the vehicle. Further, the differential control section 112 enhances a responsibility of the control in the vicinity of a steering neutral point and realizes a smooth steering. Moreover, the SAT estimating feedback section 115A inputs the torque signal Tr, a signal obtained in the adding section 116A by adding the output of the differential control section 112 to the output of the assist amount calculating section 111, the motor angular speed ω estimated by the motor angular speed estimating section 123 and an angular acceleration *ω from the motor angular acceleration estimating section 124, estimates an SAT as a reaction force from the road, performs a signal processing for the estimated SAT by using a feedback filter, and provides the steering wheel with a suitable road information as the reaction force.

Further, a steering assist command value that is obtained in the adding section 116B by adding the output of the yaw rate convergence control section 113 to the steering assist command value obtained in the adding section 116A by adding the output of the differential control section 112 to the output of the assist amount calculating section 111, is inputted into the robust stabilizing compensation section 114 as an assist amount AQ. The robust stabilizing compensation section 114 is a section such as a compensation section disclosed in Japanese Patent Application Laid-open No. H8-290778, removes a peak value in a resonance frequency of a resonance system comprising of an inertia element and a spring element included in the detected torque, and compensates a phase shift of the resonance frequency that obstructs the responsibility and the stability of the control system. By subtracting the output of the SAT estimating feedback section 115A from the output of the robust stabilizing compensation section 114 in the subtracting section 116C, a current command value (the assist amount) Ia that is capable of transmitting the road information to the steering wheel as the reaction force, is obtained.

Moreover, the motor angular speed estimating section 123 estimates the motor angular speed ω based on the voltage Vm applied between the motor terminals and the motor current i, and the motor angular speed ω is inputted into the motor angular acceleration estimating section 124, the yaw rate convergence control section 113 and the SAT estimating feedback section 115A. The motor angular acceleration estimating section 124 estimates the motor angular acceleration based on the motor angular speed ω that is inputted, and the estimated motor angular acceleration *ω is inputted into the motor characteristic compensation section 125. In the adding section 126A, the current command value Ia that is obtained by subtracting the output of the SAT estimating feedback section 115A from the output of the robust stabilizing compensation section 114, is added to the output Ic of the motor characteristic compensation section 125, the added signal is inputted into the compensation section 121 comprising a differential compensator as a current command value Ir. A current command value I that is obtained by adding the output of the disturbance estimating section 122 in the adding section 126B to a current command value Ira compensated by the compensation section 121, is inputted into the motor driving unit 21 and the disturbance estimating section 122. The disturbance estimating section 122 is such an apparatus disclosed in Japanese Patent Application Laid-open No. H8-310417, is capable of maintaining a desired motor control characteristic in an output reference of the control system based on a signal obtained by adding the output of the disturbance estimating section 122 to the current command value Ira compensated by the compensation section 121 that is the control target of the motor output and the motor current i, and does not lose the stability of the control system.

Here, aspects of torques generated between a road and a steering will be described with reference to FIG. 3. When a driver steers the steering wheel 1, a steering torque Th is generated and then the motor 20 generates an assist torque Tm in accordance with the steering torque (the torque signal) Th. As a result, wheels are steered, and an SAT is generated as the reaction force. Further, in such case, due to an inertia J and a friction (a static friction) Fr of the motor 20, a torque that will become the resistance of steering the steering wheel, is generated. By considering a balance between these forces, a motion equation such as the following Expression 1 can be obtained.

$$J \cdot {}^*\omega + Fr \cdot \text{sign}(\omega) + SAT = Tm + Th \qquad \text{[Expression 1]}$$

Here, when setting initial values to zero, performing a Laplace transform (s: Laplace operator) for the above Expression 1 and then solving the SAT, the following Expression 2 can be obtained.

$$SAT(s) = Tm(s) + Th(s) - J \cdot {}^*\omega(s) - Fr \cdot \text{sign}(\omega(s)) \qquad \text{[Expression 2]}$$

It is clear from the above Expression 2 that by preliminarily obtaining the inertia J and the static friction Fr of the motor 20 as constants, it is possible to estimate the SAT based on the motor rotation angular speed ω, the rotation angular acceleration *ω, the assist torque Tm and the steering torque Th. From such a reason, the torque signal Tr, the angular speed ω, the angular acceleration *ω and the output of the assist amount calculating section 111 are inputted into the SAT estimating feedback section 115A.

Further, in the case of feeding back the SAT information estimated by the SAT estimating feedback section 115A without any processing, since the steering becomes too heavy, it is impossible to improve the steering feeling. Therefore, as shown in FIG. 4, by using a feedback filter 115AF having a velocity-sensitive gain and a frequency characteristic, a signal processing of an estimate value of the SAT is performed and only necessary and sufficient information for improving the steering feeling is fed back. The feedback filter 115AF used in here includes a Q-filter (phase-lag) 115B having a gain that reduces the amplitude of the estimated SAT to a necessary and sufficient value and a gain section 115C having a gain characteristic that is sensitive about the velocity signal Vel as shown in FIG. 5, and in the case that the importance of road information such as static steering and low speed driving is relatively low, decreases the road information to feed back.

Although the apparatus described in the above Patent Document 2 configures the feedback of SAT-estimating so that a frequency band in which there are disturbances needed to suppress and a frequency band in which there are disturbances needed to transmit are compatible, there is no function that actively cancel out disturbances needed to suppress.

On the other hand, in the vehicles, at an ordinary braking and a steady-state running, brake judder and shimmy that give annoyance to passengers occur. The brake judder is a floor and pedal vibration occurring at braking of the vehicle, and sometimes induces a steering rotational vibration. The excitation source of the brake judder is a variation in the braking torque due to DTV (Disk Thickness Variation) of the brake disk, and it has the first and higher order contents of the wheel rotation. The brake judder is amplified by the resonance or the like at front and rear of the suspension, transmitted through the vehicle body and the steering system, and ultimately becomes the floor and pedal vibration and the steering vibration. Further, the shimmy is a vibration in steering rotation direction during the vehicle running. The excitation source is an imbalance and non-uniformity of rotating parts such as tires and wheels. The shimmy is amplified by the suspension resonance, and becomes a steering rotational vibration through the steering system.

The apparatus disclosed in Patent Document 2 does not entirely consider the brake judder and the shimmy. Further, in Japanese Patent Application Laid-open No. 2002-145075 (Patent Document 3) and Japanese Patent Application Laid-open No. 2002-161969 (Patent Document 4), although apparatuses that damp vibrations of the brake judder and the shimmy are disclosed, both of which are mechanical handling, and there is a problem that the cost increases occurs and a finely-tuned suppression such as the velocity sensitive is not possible.

THE LIST OF PRIOR ART DOCUMENTS

Patent Documents

Patent Document 1: Japanese Patent Application Laid-open No. H8-290778
Patent Document 2: Japanese Patent Application Laid-open No. 2002-369565
Patent Document 3: Japanese Patent Application Laid-open No. 2002-145075
Patent Document 4: Japanese Patent Application Laid-open No. 2002-161969
Patent Document 5: Japanese Patent Application Laid-open No. 2006-199219
Patent Document 6: Japanese Patent Application Laid-open No. 2007-84006

SUMMARY OF THE INVENTION

Problems to be Solved by the Invention

As an apparatus for solving such a problem, there is an apparatus disclosed in Japanese Patent Application Laid-open No. 2006-199219 (Patent Document 5). In the apparatus disclosed in Patent Document 5, as shown in FIG. 6 corresponding to FIG. 2, an SAT estimating section 117 inputs the torque signal Tr, the angular speed ω, the angular acceleration *ω and the added result (calculated result of the assist amount) in the adding section 116A to estimate the SAT, and adds the SAT-estimate value *SAT to the adding section 116C through the SAT feedback section 118. The configuration of the SAT feedback section 118 is shown in FIG. 7. That is, the SAT feedback section 118 comprises a velocity-sensitive type high-pass filter 118-1 that inputs the SAT-estimate value *SAT and outputs high-frequency components and a velocity-sensitive type gain section 118-3 that multiply a gain G.

In such a configuration, although the SAT estimating section 117 inputs the torque signal Tr, the angular speed ω, the angular acceleration *ω and the added result in the adding section 116A to estimate the SAT as a reaction force, the estimating operation is carried out based on the method of the above described Expression 2. The estimated SAT-estimate value *SAT is inputted into the high-pass filter 118-1 in the SAT feedback section 118. In this way, only high-frequency components relating to the brake judder and the shimmy, it is possible to perform the suppression of the brake judder and the shimmy. The output of the high-pass filter 118-1 that only high-frequency components passed, is inputted into the gain section 118-3 to be multiplied by the gain G and is outputted as an SAT-estimate value *SATc. The SAT-estimate value *SATc is added to the output (the current command value) of the robust stabilizing compensation section 114 in the adding section 116D and the added result is inputted into the motor system control section 120.

In this way, in the apparatus disclosed in Patent Document 5, the SAT-estimate value *SAT as a reaction force passes the high-pass filter 118-1, reaction force components that are not necessary to transmit to the driver are extracted and the extracted components are added to the current command value for the correction. Therefore, it is possible to cancel out the reaction force components that is not necessary to transmit to the driver, and it is possible to give the driver a comfortable steering feeling. When adding the SAT-estimate value *SAT without any processing and then correcting, since it is impossible to successfully reduce, so the SAT-estimate value *SAT is added after multiplying the gain G.

Here, disturbances occur due to an imbalance of braking force in the case of conducting an emergency braking and an imbalance (detachment of balance weight) of tires and so on, and appear in a resonance frequency (15 to 20 Hz) of the suspension. Although the apparatus disclosed in Patent Document 5 filters the disturbances in the above resonance frequency band (15 to 20 Hz), multiplies the gain and feeds back, there is a possibility to exert a bad influence at the time of an ordinary steering when performing an overdone gain and frequency band setting for enhancing the disturbance suppression effect. Information of less than or equal to the frequency 10 Hz that is an important road information for the steering feeling, is also suppressed, and the driver is hard to steer the steering wheel. Since the road information such as rolls and ruts is less than or equal to 10 Hz, the road information becomes not being transmitted to the driver through the steering wheel. Further, in an emergency braking state, there are many the case without performing the steering wheel operation and the case not needing fine road information.

Moreover, an apparatus disclosed in Patent Document 6 extracts a disturbance torque component corresponding to disturbances from a torque signal by means of a high-pass filter, differentiates the extracted disturbance torque component to obtain a disturbance torque differential value, generates a correction value corresponding to the disturbance torque differential value, corrects a target current value by using the correction value, and drives a motor based on the target current value after the correction.

Here, since the more an emergency braking (a high deceleration) the more a large vibration from the bottom, the vibration of the steering wheel due to the brake judder becomes large. That is, since the emergency braking→a change in velocity is large→the deceleration becomes high, and at the same time, the emergency braking→a force to be acted to the brake pad is large→an excitation force is large→the vibration of the steering wheel becomes large, it is necessary to enhance the vibration suppression effect in accordance with the deceleration level. However, in the apparatus disclosed in Patent Document 6, such a countermeasure is not taken. Further, by means of a CAN (Controller Area Network) communication, the electric power steering apparatus obtains the velocity information that is obtained by calculating based on the speed information of each wheel from the vehicle. That is, since the speed of each wheel→calculating the velocity→CAN communication→EPS detects the velocity, the actual circumstances is that a calculation delay occurs. Therefore, in order to rapidly suppress the vibration, a velocity without delay is necessary. However, in the apparatus disclosed in Patent Document 6, such a countermeasure is not taken.

The present invention has been developed in view of the above described circumstances, and an object of the present invention is to provide an electric power steering apparatus that is capable of obtaining a more safe and comfortable handling performance by that a signal processing of road information and disturbances is performed to realize a easy tuning, and a vibration absorption level for brake is improved by a filter and a gain section considering a frequency characteristic and a decelerating acceleration (an emergency braking).

As a vehicle body improvement in years to come, there is a possibility that rigidity of a suspension varies (becomes high) and a vibration characteristic varies. Since there is a possibility that effects reduces by using a vibration suppression structure of the present circumstances as described above, in order to further increase the vibration suppression characteristic, another object of the present invention is to provide an electric power steering apparatus that is capable of enhancing suppression effects and at the same time performing the vibration suppression control without damaging road information during an ordinary running by utilizing a decelerating acceleration and a brake signal of a vehicle, and varying a gain and a filter characteristic (that is, changing filter constants so that the more a deceleration is high, the more vibration suppression effects become good, and changing the gain so that the more the deceleration is high, the more vibration suppression effects become good.).

Means for Solving the Problems

The present invention relates to an electric power steering apparatus which controls a motor based on a current command value calculated from a steering assist command value that is calculated based on a steering torque generated in a steering shaft of a vehicle and a motor current of said motor that provides a steering mechanism having a rack shaft with a steering assist force, the above-described object of the present invention is achieved by said electric power steering apparatus that comprises a reaction force detecting means for estimating or measuring a reaction force inputted into said rack shaft; a disturbance band extracting means for extracting a frequency band of disturbances to be removed from said reaction force; and a decelerating acceleration calculating means for calculating a decelerating acceleration of said vehicle based on a velocity signal, and a reaction signal extracted by said disturbance band extracting means is varied in accordance with said decelerating acceleration, and said steering assist command value or said current command value is corrected by varied reaction force signal.

The above-described object of the present invention is more effectively achieved by that said reaction force detecting means is an SAT estimating means, and said reaction force is an SAT value; or by that said disturbance band extracting means comprises a filter and a gain section that are connected in series; or by that as said decelerating acceleration becomes high, a filter pass characteristic of said filter is increased; or by that as said decelerating acceleration becomes high, a gain of said gain section is increased; or by that with respect to said decelerating acceleration, changes of said filter pass characteristic and said gain increase continuously or in a stepwise manner; or by that a change of said filter pass characteristic or said gain has a hysteresis characteristic; or by that said velocity signal is obtained by a velocity sensor or a CAN; or by that said steering mechanism includes an intermediate shaft which is expandable and contractive; or by that a phase compensation is applied to said velocity signal or said decelerating acceleration, characteristics of said filter section and said gain unit are varied based on phase-compensated signal; or by that said decelerating acceleration is a brake stroke calculated from brake relevant signals.

Effects of the Invention

The electric power steering apparatus according to the present invention comprises a reaction force detecting means for estimating or measuring a reaction force (SAT) inputted into the rack shaft; a disturbance band extracting means for extracting a frequency band (15 to 20 Hz) of disturbances to be removed from the reaction force; and a decelerating acceleration calculating means for calculating a decelerating acceleration of the vehicle based on a velocity signal from a velocity sensor or a CAN, and the electric power steering apparatus varies a reaction signal extracted by the disturbance band extracting means in accordance with the decelerating acceleration (including a brake stroke based on the brake signal), and corrects the steering assist command value or the current command value by the varied reaction force signal. Since the disturbance band extracting means comprises a filter and a gain section, the filter pass characteristic and the gain are varied in accordance with an emergency braking state (a rapid deceleration), and varying control is performed only in the emergency braking state, it is possible to resolve the trade-off between the steering feeling and the disturbance suppression effect. Further, since varying control of the filter pass characteristic and the gain is performed in accordance with the decelerating acceleration, it is possible to improve the vibration absorption level for brake, and it is possible to obtain a more safe and comfortable handling performance.

In an ordinary steering, it is preferable to ensure the characteristic of less than or equal to the road information frequency 10 Hz that is important for the steering feeling. In an emergency braking state, since it is often the case that the steering wheel operation is not conducted and a fine road state is not necessary, there is no problem with suppressing information of a frequency band less than or equal to 10 Hz. Therefore, in the emergency braking state, by varying the filter pass characteristic and the gain so that the vibration suppression effect becomes more higher, it is possible to ensure a certain level of the vibration suppression effect by transmitting the necessary road information for the steering in the ordinary steering state, and further enhance the vibration suppression effect in the emergency braking state. In this way, according to the present invention, it is possible not to transmit an unpleasant vibration to a driver.

MODE FOR CARRYING OUT THE INVENTION

Since the present invention inserts a disturbance band extracting section comprising of a filter and a gain section in a feedback route of an SAT-estimate value, varies a filter pass characteristic and a gain in accordance with a decelerating acceleration (an emergency braking), controls a motor to cancel out a reaction force that is not necessary to transmit to a driver, increases the damping of filtering only in an emergency braking state (a sudden deceleration) to increase the level of disturbance suppression, and conducts a smooth damping in a region equal to or less than a road information frequency 15 Hz and a region equal to or more than a road information frequency 20 Hz, it is possible to resolve the trade-off between the steering feeling and the disturbance suppression effect.

Since a frequency band equal to or less than the road information frequency 10 Hz, is a frequency band that the road information such as rolls and ruts of a road during a vehicle running and vehicle behaviors appear, and becomes an important road information for a steering wheel operation, if removing the frequency band equal to or less than 10 Hz, the steering feeling will be hurt and the steering feeling will become bad. Further, a frequency band from 15 Hz to 20 Hz is a resonance frequency band with the suspension, and a running vibration on a rough road and a braking vibration in a middle and high velocity range equal to or more than 40 Km/h resonate in an eigenvalue of the suspension. For this reason, a driver feels an unpleasant vibration on the steering wheel. On the other hand, since a frequency band equal to or more than a road information frequency 20 Hz, deviates from the resonance frequency band of the suspension, although there are few problems as a vibration level, in order to transmit the road information to the driver as a natural steering feeling, it is better not to damp this frequency band. The present invention is based on characteristics of such a road information frequency.

Figure 8:
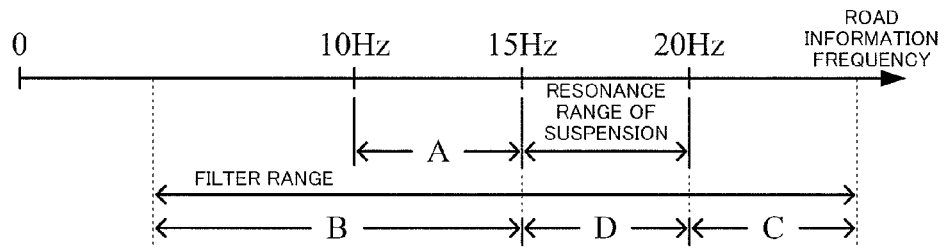
FIG. 8 is a diagram illustrating the principle of the present invention.
Figure 9:
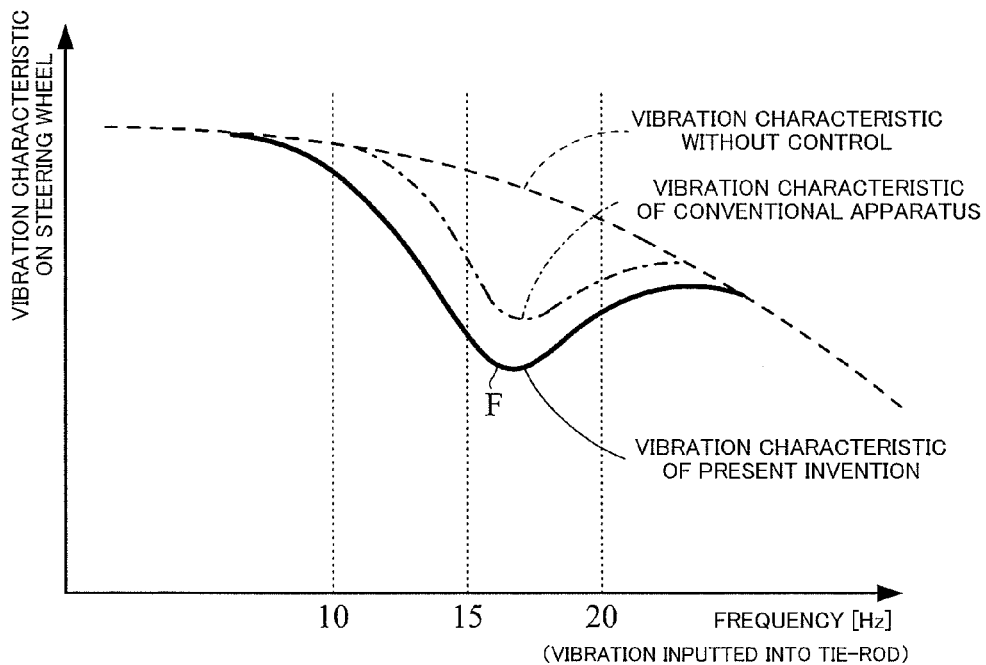
FIG. 9 is a diagram illustrating the principle of the present invention.

FIG. 8 and FIG. 9 show the principle of the present invention, a range D from the road information frequency 15 Hz to 20 Hz is the resonance frequency band of the suspension, in order to obtain a smooth steering feeling, in both ends of the range D, damping ranges (a range B and a range C) by a filter are necessary. Since the width of a range A from 10 Hz to 15 Hz is narrow, there is a possibility that the damping range overlaps a range equal to or less than 10 Hz. As described above, ideally, a characteristic (a dashed-dotted line) without damping in the range equal to or less than 10 Hz is preferable. However, in an emergency braking state, since the steering is not conducted and a fine road state is not necessary, there is no problem with setting a damping range in the range equal to or less than 10 Hz. As a problem in the design of a filter, although it is possible not to affect the characteristic equal to or less than 10 Hz by employing a filter configuration with high order, there is a problem that the calculation time is very long. In order to set in the limited calculation time, that is, in order to calculate at high speed, it is preferable that the order of a filter is low. In order to increase the damping quantity of the resonance frequency band (the range D) of the suspension by a filter with low order, although there is a possibility that damping quantities of the both ends (the range B and the range C) also become large, as described above, there is no problem in the case of changing (damping) the damping characteristic like a solid line (the present invention) only in the emergency braking state. In the case of assuming that a point F (for example, 17 Hz) in FIG. 9 is a target value of the damping, the characteristic is smoothly and gradually varied so that an uncomfortable feeling does not occur with respect to a change in the damping characteristic.

Moreover, the characteristic of a conventional apparatus indicated by a dashed-dotted line in FIG. 9, is a characteristic of the apparatus disclosed in the above-described Patent Document 5.

A general expression for the filter characteristic f is represented by the following Expression 3. Where, "s" is a Laplace operator, $b_i$ (i=1, 2, ..., m) is a high-pass filter coefficient, and $a_j$ (j=1, 2, ..., n) is a low-pass filter coefficient.

$$f=(s^m+b_1 \cdot s^{m-1}+ \ldots b_m)/(s^n+a_1 \cdot s^{n-1}+ \ldots +a_n) \quad \text{[Expression 3]}$$

Figure 10:
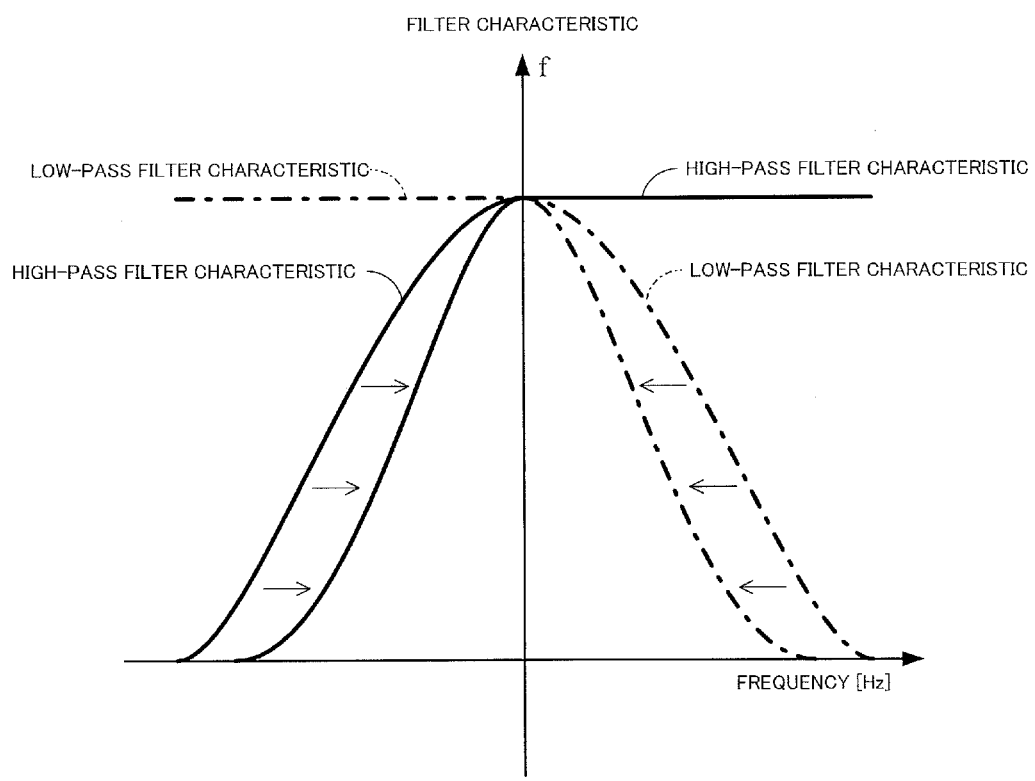
FIG. 10 is a characteristic diagram illustrating a filter characteristic.

Then, when increasing the order of the low-pass filter characteristic and the high-pass filter characteristic as shown in FIG. 10, it is possible that both the low-pass filter characteristic and the high-pass filter characteristic move as arrows and the filtering only for the peak value is capable. Since there are many filter coefficients, there is an inconvenience that the number of times of multiplication and the number of times of addition increase, the processing speed of a CPU (a calculation processing unit) becomes late, and a ROM for storing filter coefficients and a RAM for storing intermediate variables increase. Therefore, by setting the decelerating acceleration as a trigger and switching to a filter unit stored in advance in the CPU, a stable control is possible.

Figure 1:
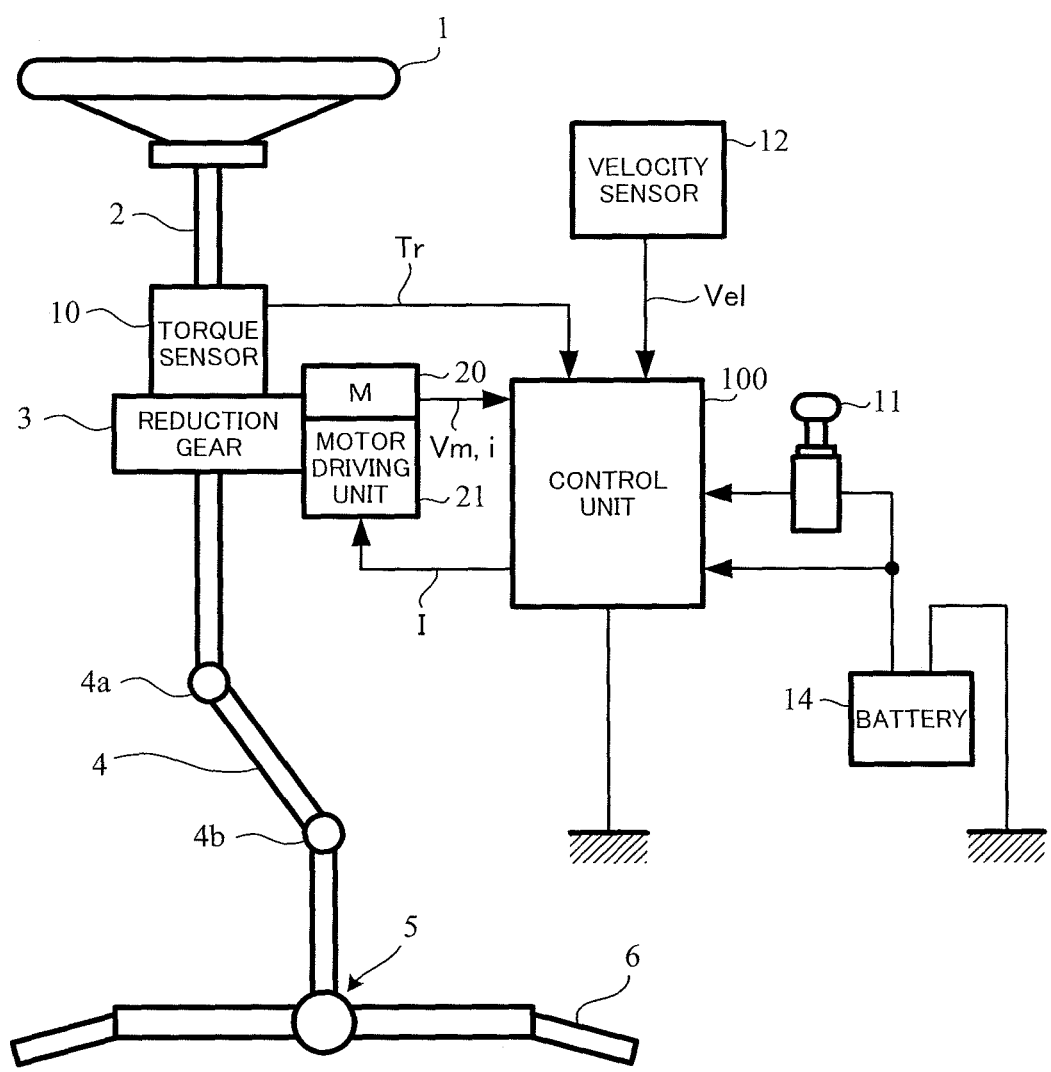
FIG. 1 is a diagram illustrating an example of a general steering mechanism.
Figure 2:
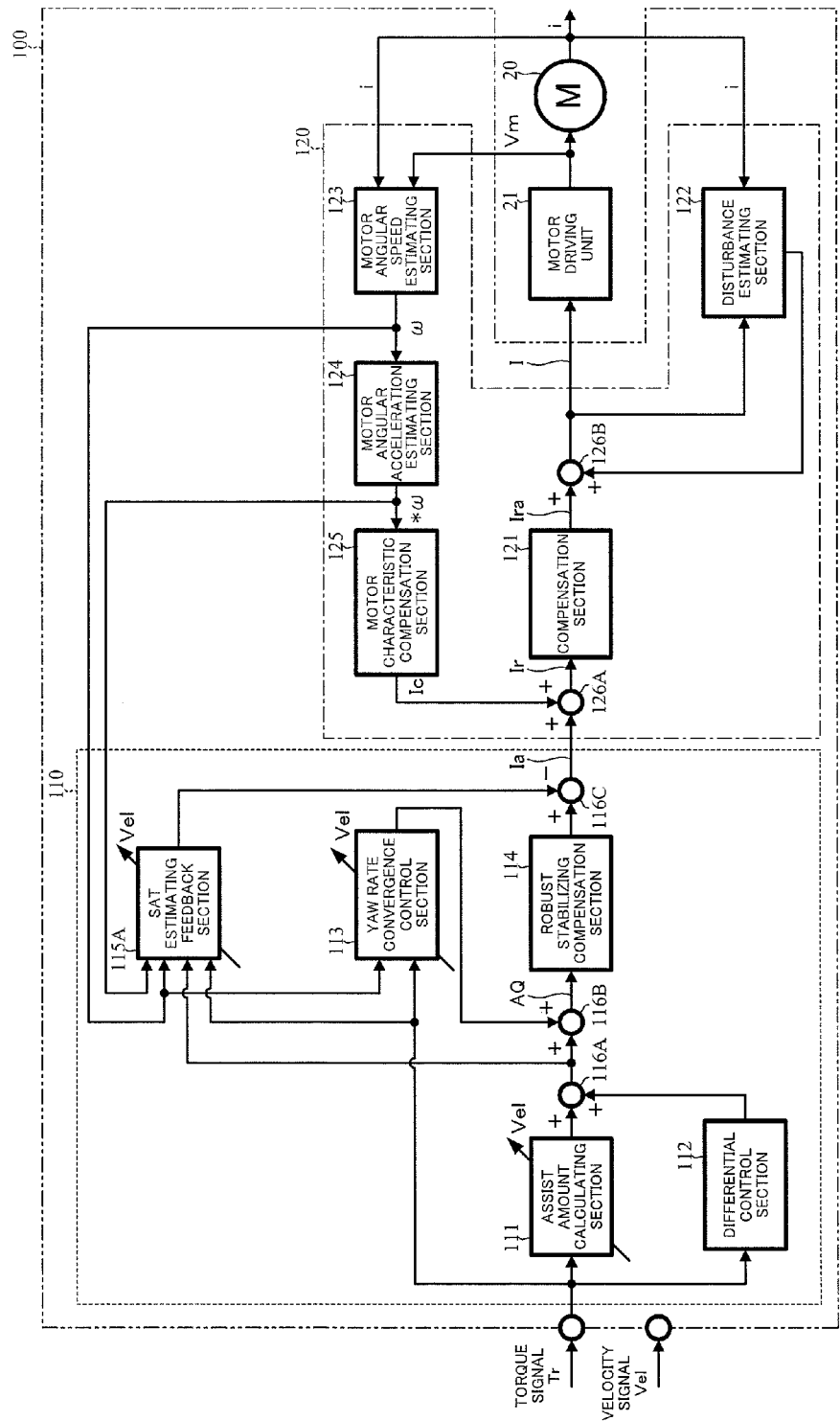
FIG. 2 is a block diagram showing a configuration example of a conventional apparatus.
Figure 3:
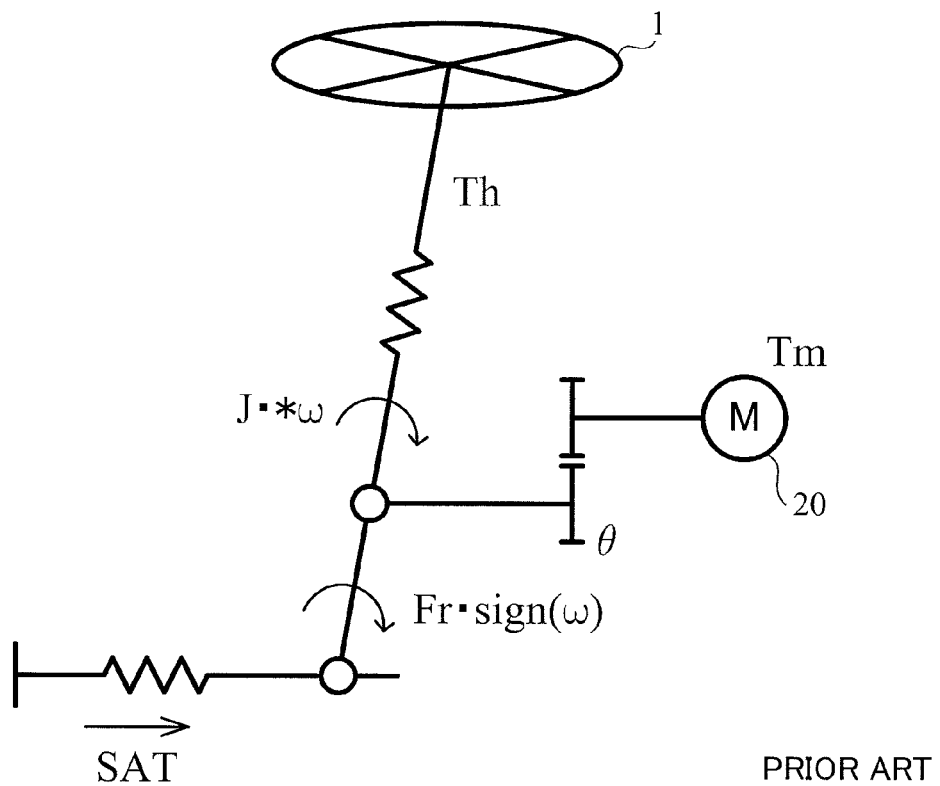
FIG. 3 is a conceptual diagram illustrating aspects of torques generated between a road and a steering.
Figure 4:
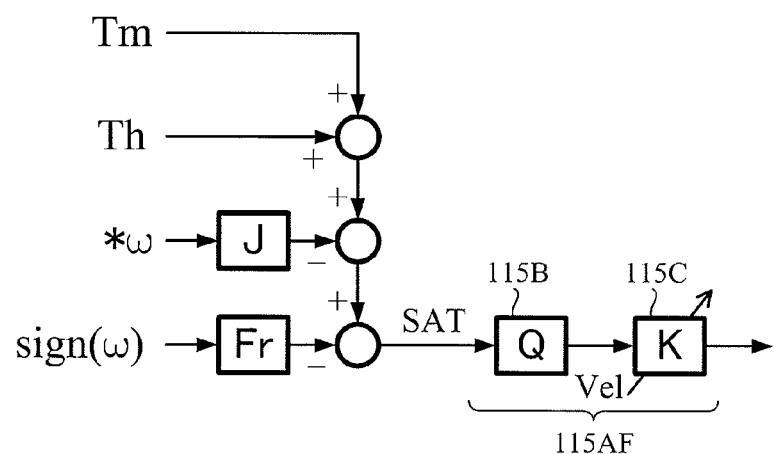
FIG. 4 is a diagram showing a configuration example of a feedback section.
Figure 5:
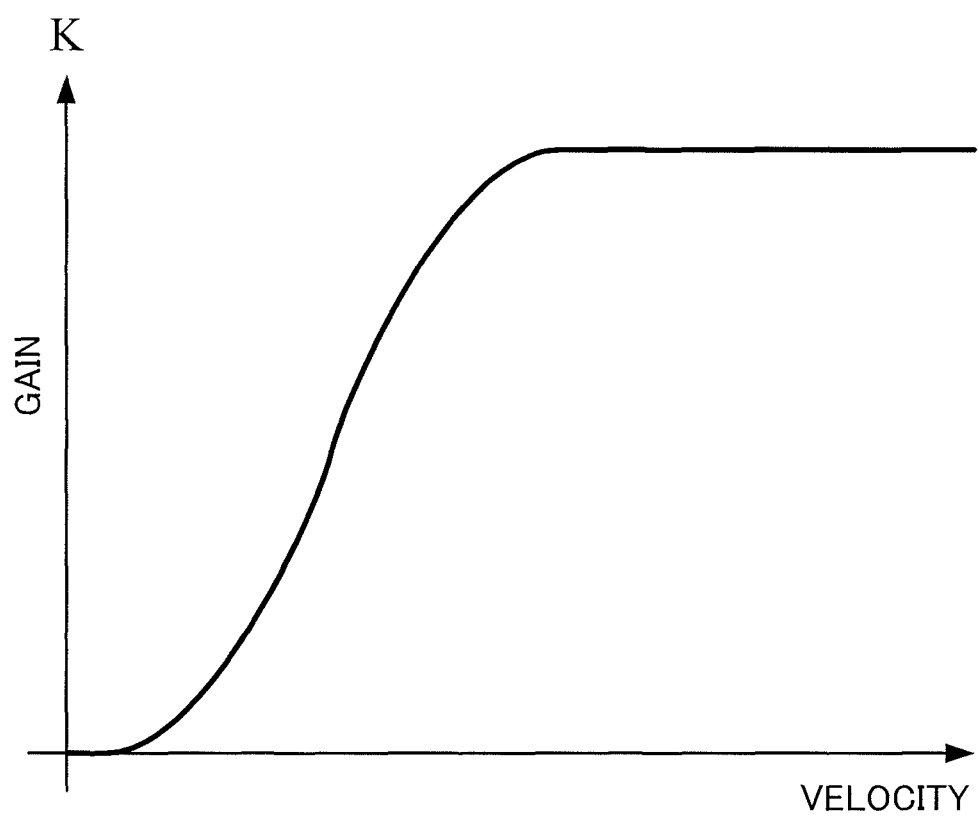
FIG. 5 is a diagram showing a characteristic example of a feedback filter.
Figure 6:
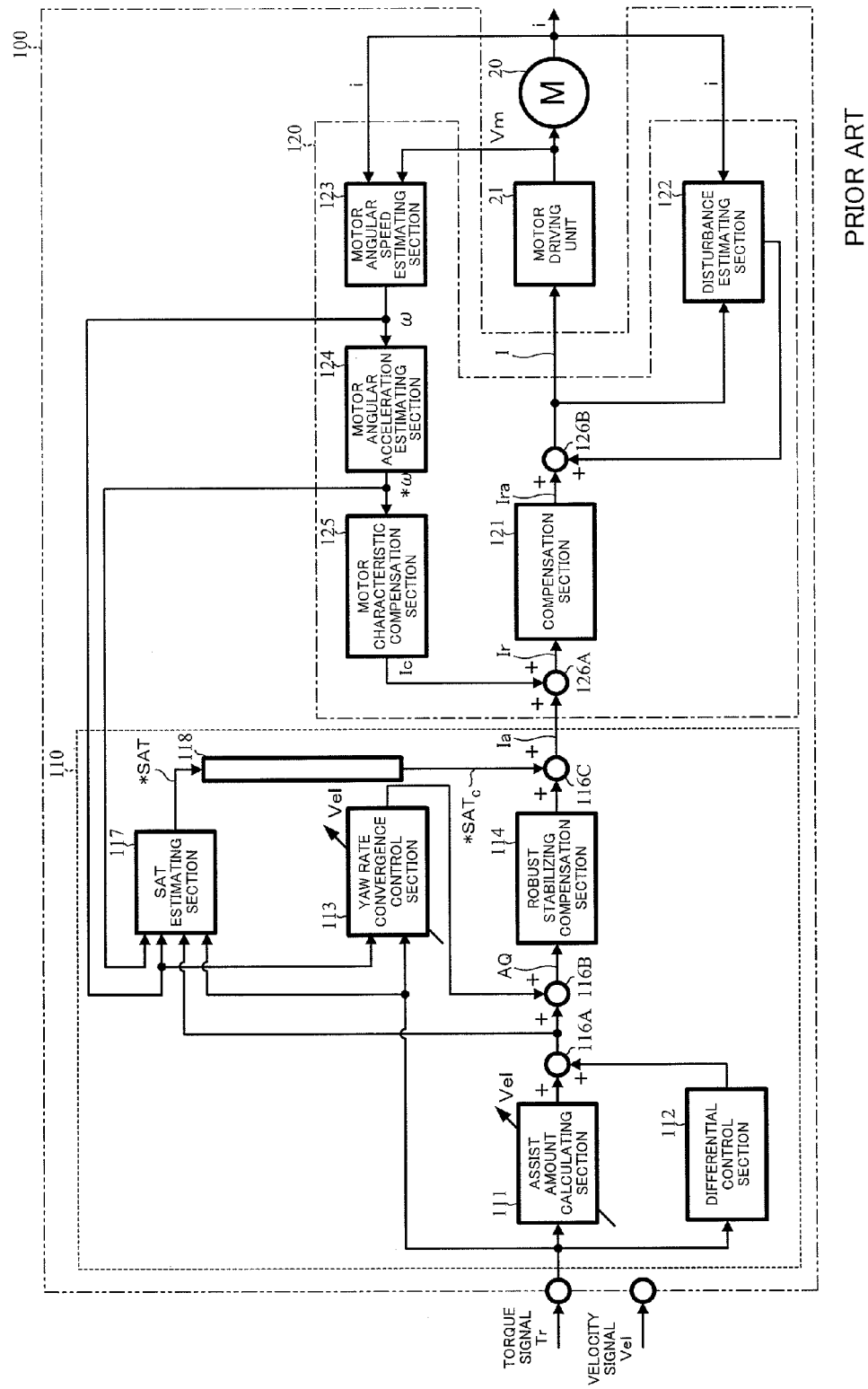
FIG. 6 is a block diagram showing a conventional apparatus.
Figure 7:
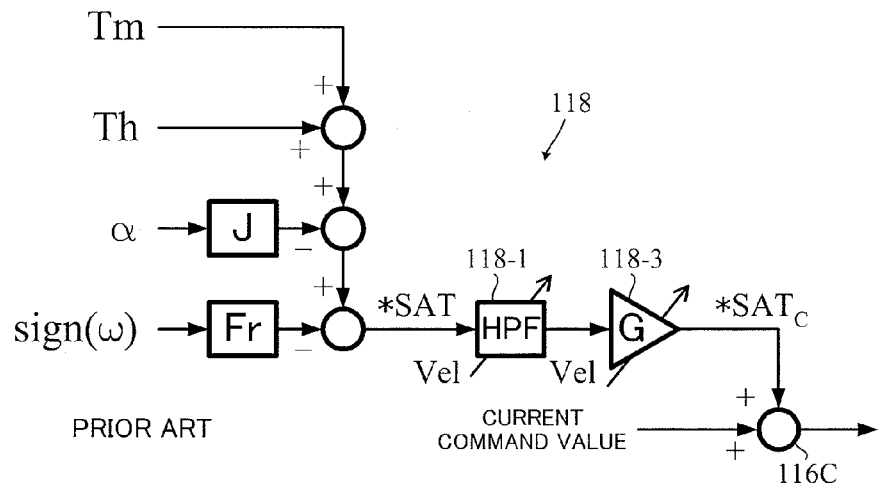
FIG. 7 is a block diagram showing a configuration example of a feedback section.
Figure 11:
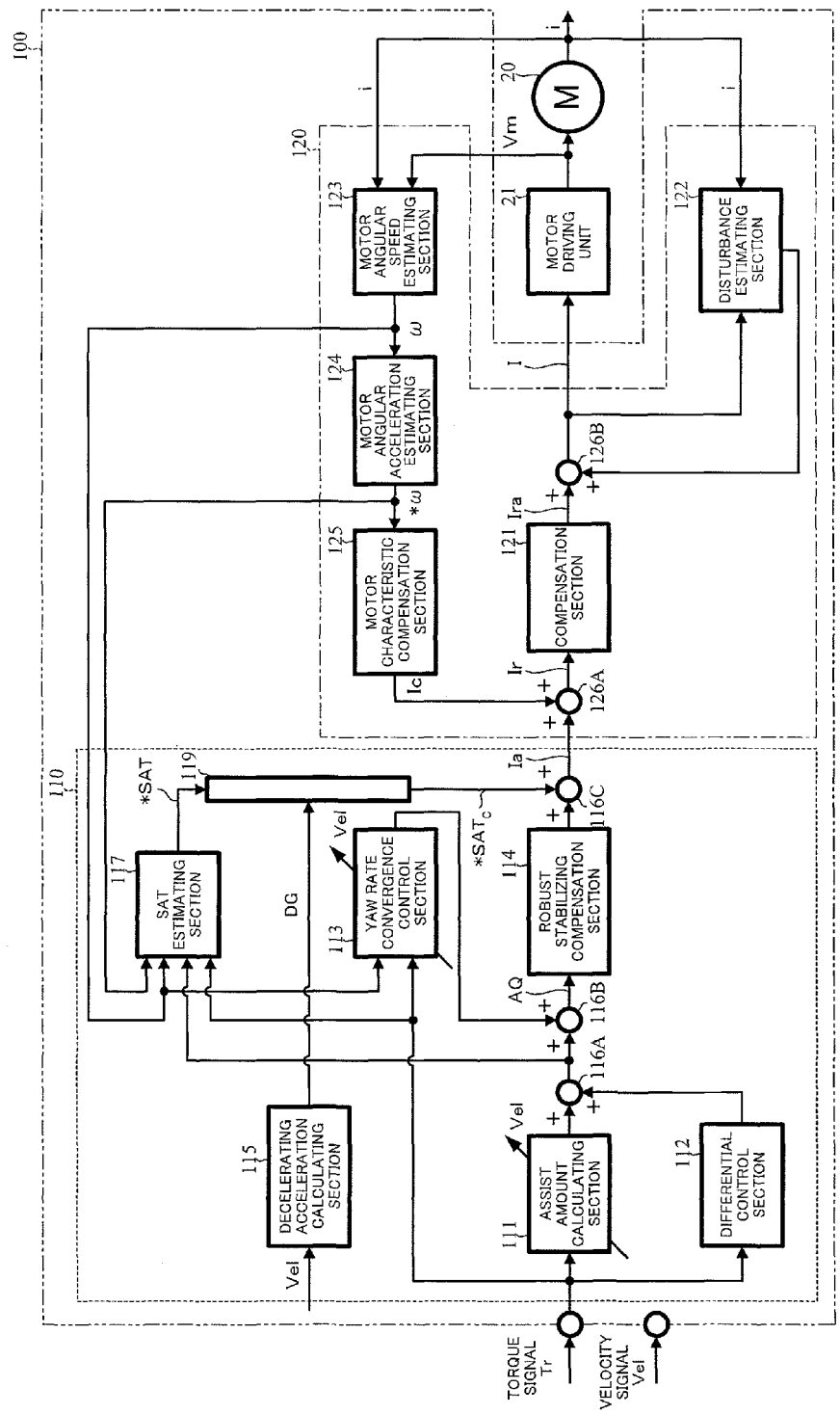
FIG. 11 is a block diagram showing a configuration example of the present invention.

FIG. 11 shows a configuration example of the present invention that corresponds to FIG. 6. In the present invention, there are in addition provided a decelerating acceleration calculating section 115 for calculating a decelerating acceleration DG based on the velocity signal Vel, and a disturbance band extracting section 119 for varying a SAT-estimate value *SAT from the SAT estimating section 117 as a reaction force detecting means based on the decelerating acceleration DG, inputting the varied SAT-estimate value *SATc into the adding section 116C and correcting the current command value. It is possible to obtain the velocity signal Vel from a velocity sensor, and it is also possible to obtain the velocity signal Vel from a CAN (Controller Area Network).

The decelerating acceleration calculating section 115 calculates the decelerating acceleration DG based on the following Expression 4. Where, "Vel" is the velocity, "t" is time and "Δ" is a variation in a unit of time.

$$DG=\Delta \text{Vel}/\Delta t \quad \text{[Expression 4]}$$

Figure 12:
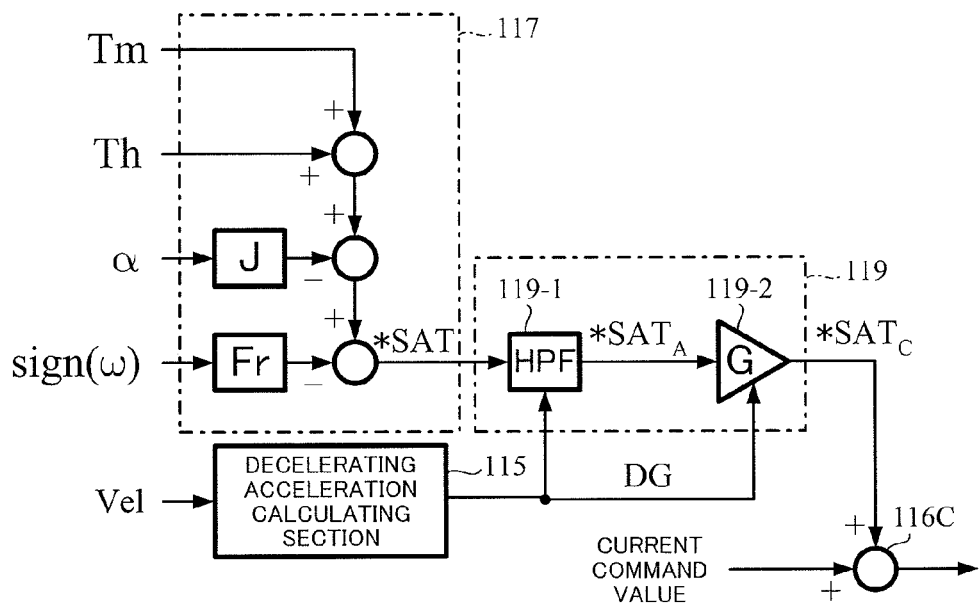
FIG. 12 is a block diagram showing a configuration example of a disturbance band extracting section according to the present invention.

As shown in FIG. 12, the disturbance band extracting section 119 comprises a filter 119-1 and a gain section 119-2, a filter pass characteristic of the filter 119-1 and a gain G of the gain section 119-2 are varied in accordance with the decelerating acceleration DG calculated in the decelerating acceleration calculating section 115, respectively.

Figure 13:
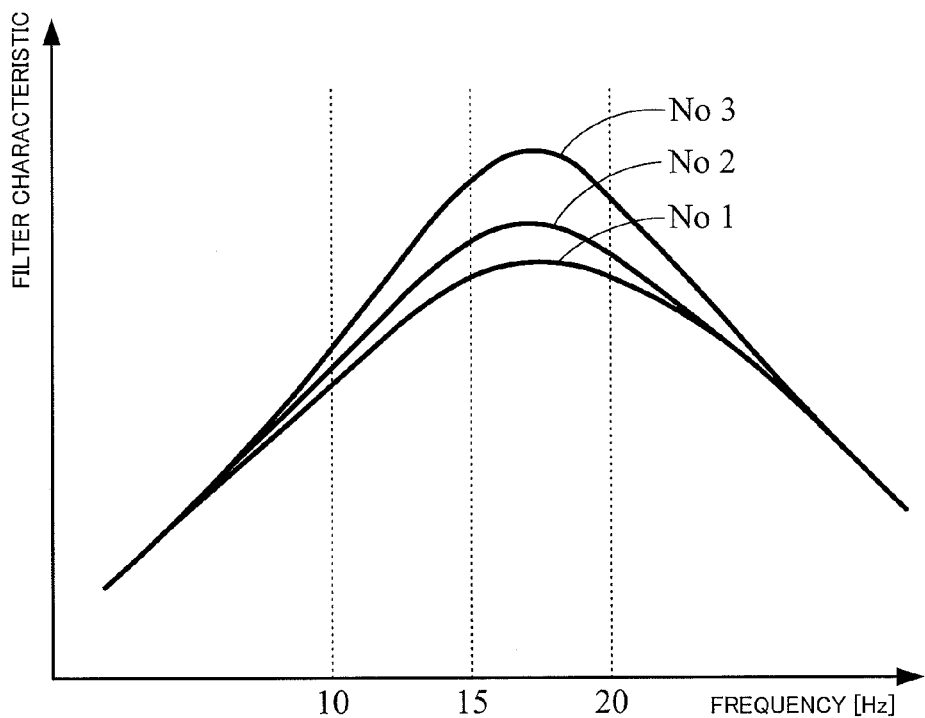
FIG. 13 is a characteristic diagram showing an example of a pass characteristic of a filter with respect to frequency.
Figure 14:
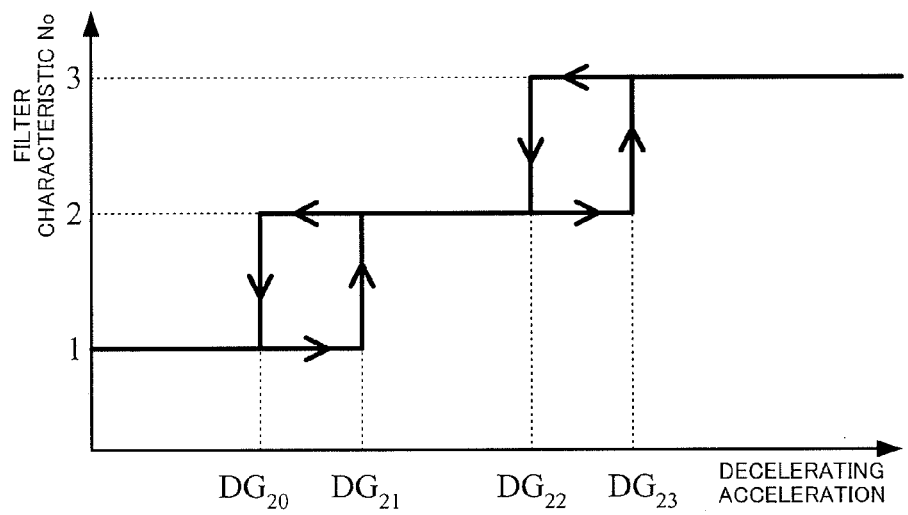
FIG. 14 is a characteristic diagram showing an example (a stepwise example) of switching of the filter with respect to a decelerating acceleration.

As shown in FIG. 13, a damping characteristic of the filter 119-1 varies in accordance with the frequency, the characteristic being high means that the pass characteristic of the signal is high, and the characteristic being low means that the pass characteristic of the signal is low. In this embodiment, as an example, filter characteristics of three kinds of filters (No1 to No3) are defined. Further, the filter characteristic with respect to the decelerating acceleration DG is shown in FIG. 14, filters No1, No2 and No3 are switched in accordance with the decelerating acceleration DG. Then, when switching the filters No1, No2 and No3, a hysteresis characteristic is set up so that chattering does not occur. That is, in the case that the decelerating acceleration DG becomes large, for example, the filter No1 is switched to the filter No2 by a decelerating acceleration $DG_{21}$, and the filter No2 is switched to the filter No3 by a decelerating acceleration $DG_{23}$, in the case that the decelerating acceleration DG becomes small, for example, the filter No3 is switched to the filter No2 by a decelerating acceleration $DG_{22}$, and the filter No2 is switched to the filter No1 by a decelerating acceleration $DG_{20}$.

Moreover, in this embodiment, although the filter characteristic of the filter 119-1 is varied in a stepwise manner with respect to the decelerating acceleration DG, it is also possible to vary continuously. Further, although three kinds of filters No1, No2 and No3 are used as the filter 119-1, it is possible to use an arbitrary number of filters as the filter 119-1.

Figure 15:
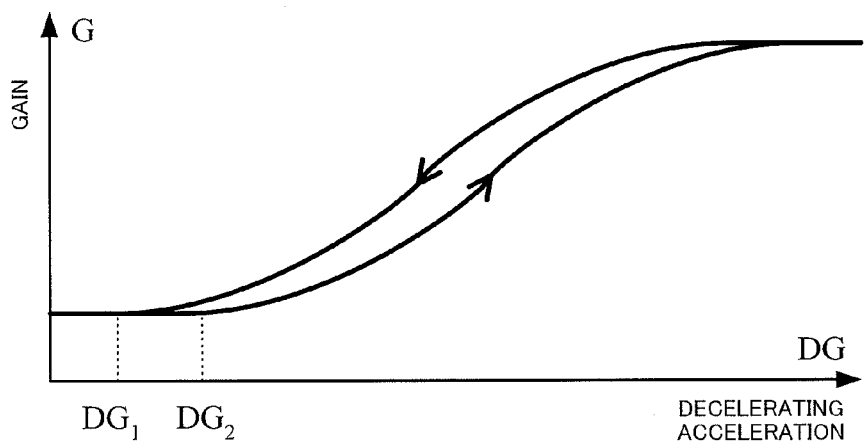
FIG. 15 is a characteristic diagram showing a characteristic example (a continuous example) of a gain unit with respect to the decelerating acceleration.
Figure 16:
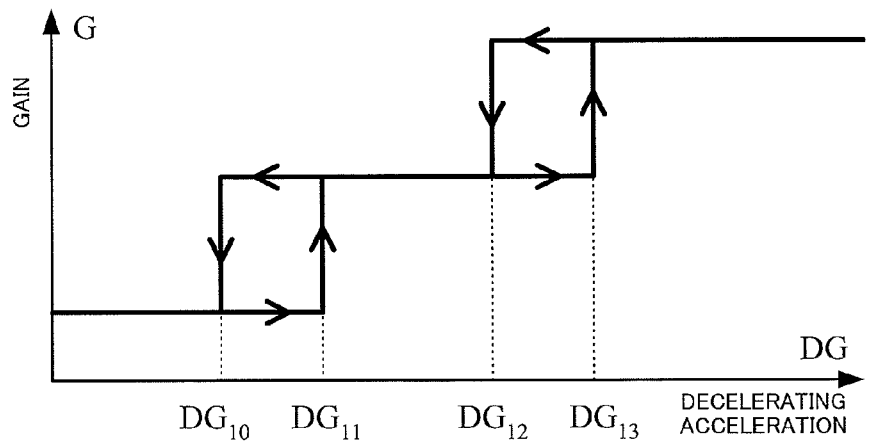
FIG. 16 is a characteristic diagram showing a characteristic example (a stepwise example) of the gain section with respect to the decelerating acceleration.

FIG. 15 shows a case that the characteristic of the gain section 119-2 with respect to the decelerating acceleration DG is varied continuously, and FIG. 16 shows a case that the characteristic of the gain section 119-2 with respect to the decelerating acceleration DG is varied in a stepwise manner, both of which also become larger as the decelerating acceleration DG becomes large. Then, in order to prevent the chattering of switching, there is a hysteresis characteristic of "$DG_1<DG_2$" in the case of FIG. 15, and for example, there are hysteresis characteristics of "$DG_{10}<DG_{11}$" and "$DG_{12}<DG_{13}$" in the case of FIG. 16.

In such a configuration, except for the decelerating acceleration calculating section 115 and the disturbance band extracting section 119, operations and functions of other sections are the same as FIG. 6, the descriptions about the other sections are omitted. In the present invention, the decelerating acceleration calculating section 115 calculates the decelerating acceleration DG based on the velocity signal Vel and inputs the decelerating acceleration DG into the filter 119-1 and the gain section 119-2 within the disturbance band extracting section 119. The SAT estimating section 117 estimates the SAT-estimate value *SAT based on the above description and inputs the SAT-estimate value *SAT into the filter 119-1 within the disturbance band extracting section 119, the SAT-estimate value *$SAT_A$ damped by the filter 119-1 is inputted into the gain section 119-2, the SAT-estimate value *$SAT_c$ multiplied by the gain G in the gain section 119-2 is added to the current command value in the adding section 116C, the current command value is corrected.

Figure 17:
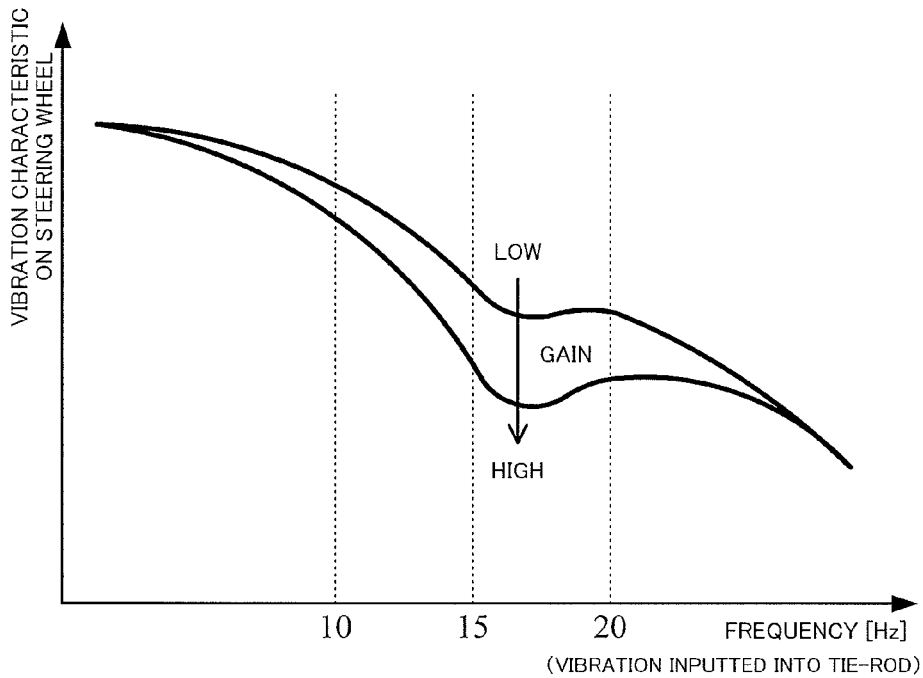
FIG. 17 is a characteristic diagram showing a relation between a frequency band and a gain.
Figure 18:
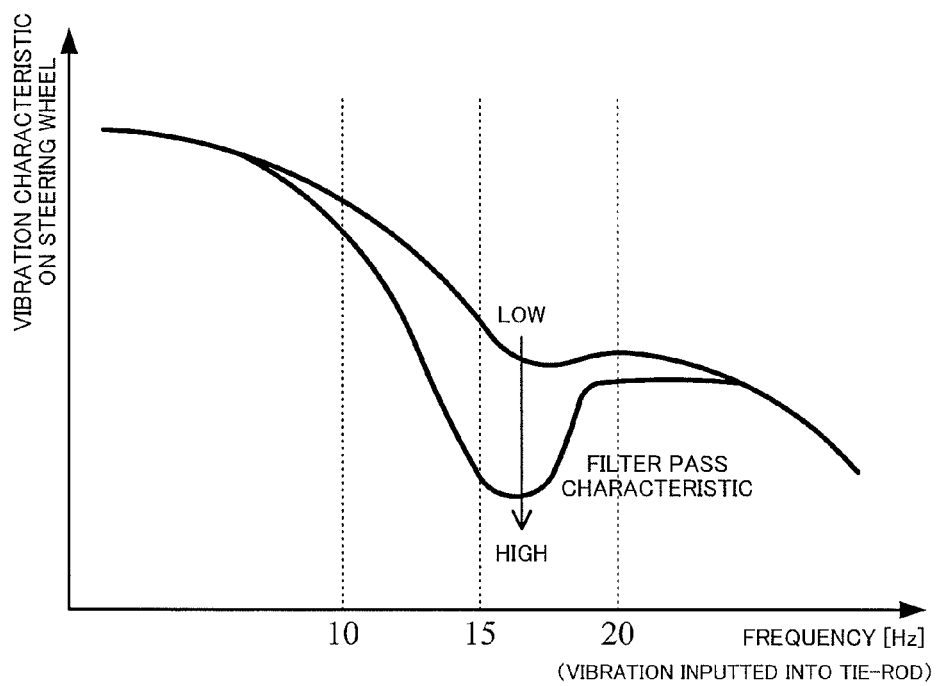
FIG. 18 is a diagram showing a relation between the frequency band and the filter pass characteristic.

On the other hand, the velocity signal Vel from the velocity sensor or the CAN is inputted into the decelerating acceleration calculating section 115, and the calculated decelerating acceleration DG is inputted into the filter 119-1 and the gain unit 119-2. Then, as shown in FIG. 13 and FIG. 14, the filter pass characteristic of the filter 119-1 is varied in accordance with the decelerating acceleration DG, at the same time, the gain G of the gain section 119-2 is varied in accordance with the characteristic shown in FIG. 15 or FIG. 16. A relationship between a frequency band with respect to the gain G of the gain section 119-2 and a vibration characteristic on the steering wheel is shown in FIG. 17, the vibration characteristic damps as the gain G becomes large. Further, a relationship between a frequency band with respect to the filter 119-1 and a vibration characteristic on the steering wheel is shown in FIG. 18, the vibration characteristic damps as the filter pass characteristic becomes large. A whole of the filter 119-1 and the gain section 119-2 becomes a damping characteristic indicted by a solid line in FIG. 9. Moreover, in this embodiment, although both the filter 119-1 and the gain section 119-2 are varied in accordance with the decelerating acceleration DG, it is possible that only the gain section 119-2 is varied in accordance with the decelerating acceleration DG.

Figure 19:
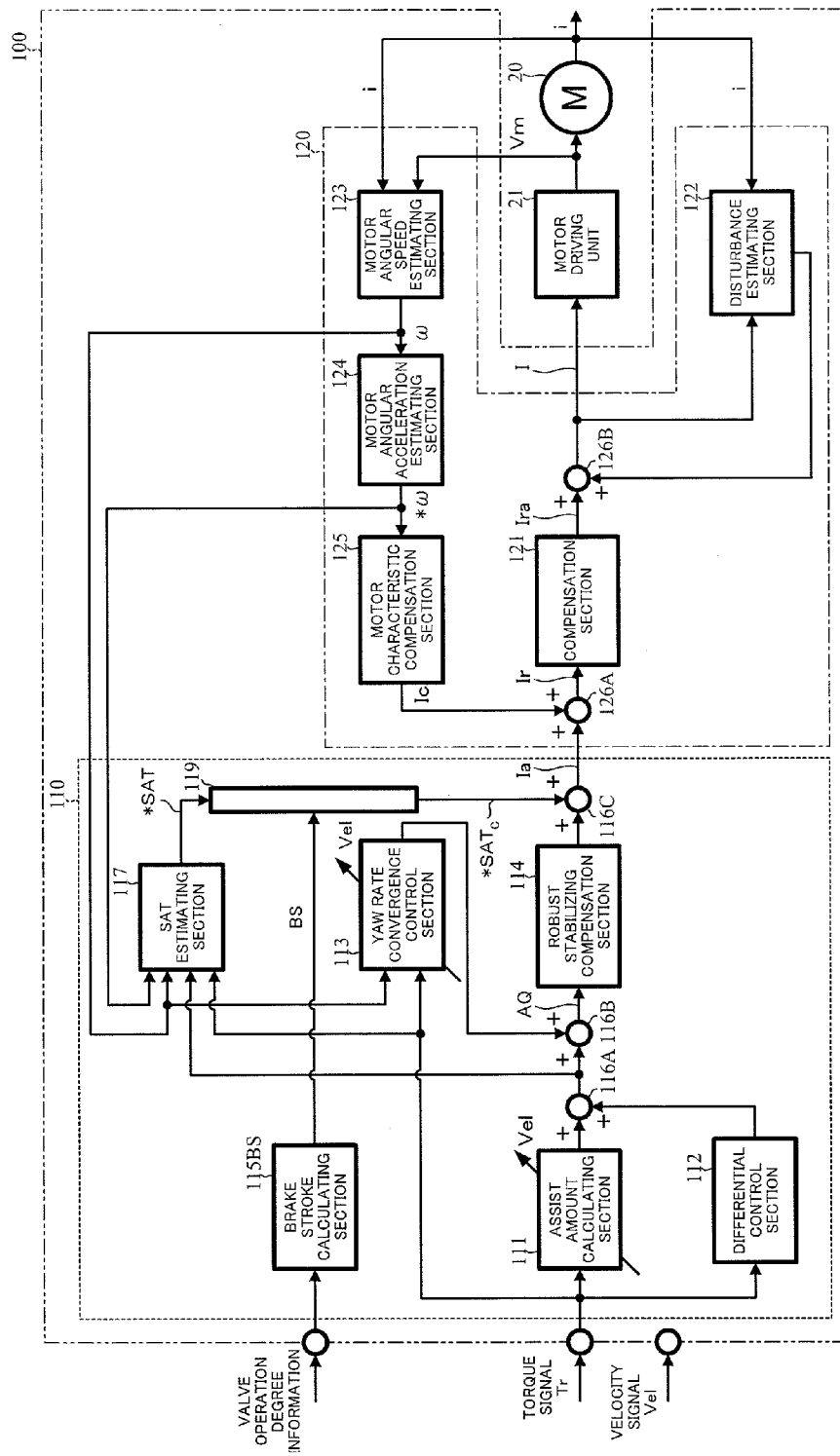
FIG. 19 is a block diagram showing another embodiment of the present invention.

In the above-described embodiment, although the decelerating acceleration DG (an emergency braking state) is calculated from the velocity signal Vel, it is also possible to calculate a brake stroke from a braking signal being an operation signal of a brake pedal and use the calculated brake stroke. FIG. 19 shows a configuration example of that case, a valve operation degree information such as throttle-by-wire is inputted into a brake stroke calculating section 115BS, the filter 119-1 and the gain unit 119-2 within the disturbance band extracting section 119 are varied in accordance with the calculated brake stroke BS.

Figure 20:
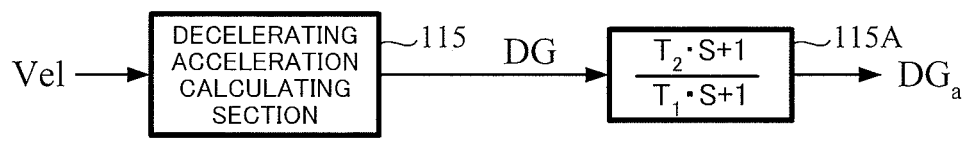
FIG. 20 is a block diagram showing a configuration example of a phase compensation.
Figure 21:
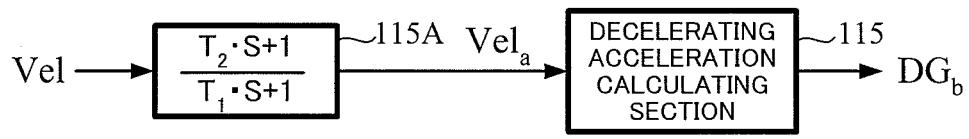
FIG. 21 is a block diagram showing another configuration example of the phase compensation.

Further, as described above, as shown in FIG. 11, although the velocity signal Vel is inputted into the decelerating acceleration calculating section 115 and the filter 119-1 and the gain section 119-2 are directly switched by the calculated decelerating acceleration DG, it is also possible to perform a phase compensation. FIG. 20 shows an embodiment that the decelerating acceleration DG calculated in the decelerating acceleration calculating section 115 based on the velocity signal Vel, is inputted into a phase-lead compensation section 115A, and then the phase-compensated decelerating acceleration DGa is inputted into the filter 119-1 and the gain section 119-2. FIG. 21 shows an embodiment that the velocity signal Vel is inputted into the phase-lead compensation section 115A, the phase-compensated velocity signal Vela is inputted into the decelerating acceleration calculating section 115, and then the calculated decelerating acceleration DGb is inputted into the filter 119-1 and the gain section 119-2.

Since both of which perform a phase compensation and phase advances, it is possible to early perform a change of the filter, therefore it is possible to more effectively perform the vibration suppression control characteristic. Particularly, with respect to the velocity signal Vel that is inputted, since the calculated signal is inputted, a value later than an actual velocity is inputted, it is possible to enhance the vibration suppression effect by the phase-lead compensation of the velocity signal Vel.

In this way, since the present invention varies the filter pass characteristic and the gain in the resonance frequency band of the suspension in accordance with an emergency braking state (a sudden deceleration), and performs the varying control only in an emergency braking state, it is possible to resolve the trade-off between the steering feeling and the disturbance suppression effect. Further, since the varying control of the filter pass characteristic and the gain is performed in accordance with the decelerating acceleration, it is possible to improve the vibration absorption level for brake, and it is possible to obtain a more safe and comfortable handling performance.

Figure 22:
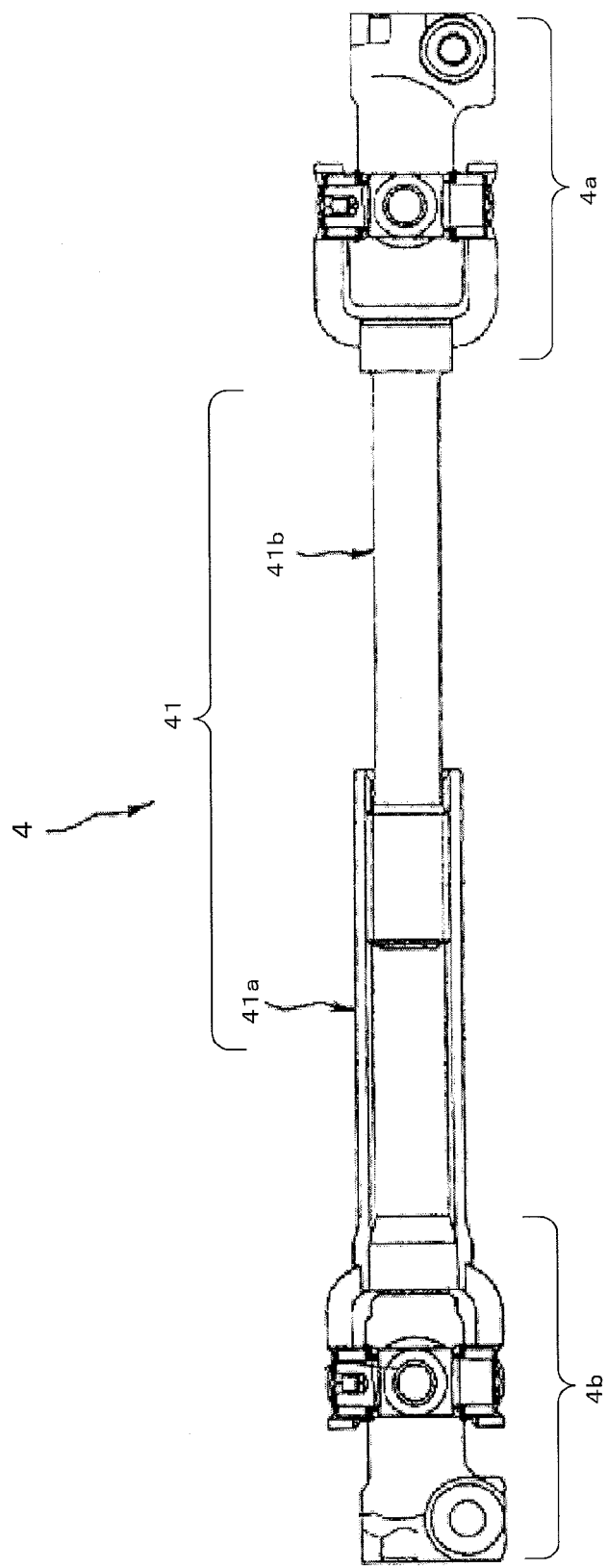
FIG. 22 is a mechanism diagram showing an example of a slide mechanism of an intermediate shaft.

Moreover, in the electric power steering apparatus comprising an intermediate shaft 4 that is capable of expansion/contraction by the means of a slide mechanism 41 comprising a male shaft 41b and a female shaft 41a shown in FIG. 22, the influence of the vibration transmission due to the rigidity of the intermediate shaft 4 is considered, when performing play adjustment by means of a nylon-coated spline, a ball spline or the like, the rigidity improves, on the other hand, the transmission characteristic of vibration decays. However, according to the present invention, it is possible to expect the vibration suppression effect even in such a case.

Moreover, in the above-described embodiments, although the SAT is estimated by the SAT estimating section 117, it is also possible to obtain the SAT by measuring with a sensor. Further, in the above description, although the switching of the filter and the gain section is performed by using the decelerating acceleration and the braking signal, it is also possible to use a longitudinal directional acceleration sensor.

EXPLANATION OF REFERENCE NUMERALS 1 steering wheel (handle)
2 column shaft
3 reduction gears
4 intermediate shaft
10 torque sensor
11 ignition key
12 velocity sensor
20 motor
21 motor driving unit
41 slide mechanism
100 control unit
110 torque system control section
111 assist amount calculating section
112 differential control section
113 yaw rate convergence control section
114 robust stabilizing compensation section
115 decelerating acceleration calculating section
116 phase-lead compensation section
115BS brake stroke calculating section
117 SAT estimating section
118 SAT feedback section
119 disturbance band extracting section
120 motor system control section
121 compensation section
122 disturbance estimating section
123 motor angular speed estimating section
124 motor angular acceleration estimating section
125 motor characteristic compensation section

The invention claimed is:

1. An electric power steering apparatus which controls a motor based on a current command value calculated from a steering assist command value that is calculated based on a steering torque generated in a steering shaft of a vehicle and a motor current of said motor that provides a steering mechanism having a rack shaft with a steering assist force, comprising:
a reaction force detecting means for estimating or measuring a reaction force inputted into said rack shaft;
a disturbance band extracting means comprising a filter section and a gain section that are connected in series, and for extracting a resonance frequency band to suspension of said vehicle as disturbances to be removed from said reaction force; and
a deceleration calculating means for calculating a deceleration of said vehicle based on a velocity signal; and
wherein said steering assist command value or said current command value is corrected with a reaction signal extracted by said disturbance band extracting means, and as said deceleration becomes high, a filter-pass characteristic of said filter section and a gain of said gain section are increased.

2. An electric power steering apparatus according to claim 1, wherein said reaction force detecting means is an SAT estimating means, and said reaction force is an SAT value.

3. An electric power steering apparatus according to claim 1, wherein with respect to said deceleration, changes of said filter-pass characteristic and said gain increase continuously or in a stepwise manner.

4. An electric power steering apparatus according to claim 3, wherein a change of said filter-pass characteristic or said gain has a hysteresis characteristic.

5. An electric power steering apparatus according to claim 1, wherein said velocity signal is obtained by a velocity sensor or a CAN.

6. An electric power steering apparatus according to claim 1, wherein said steering mechanism includes an intermediate shaft which is expandable and contractive.

7. An electric power steering apparatus according to claim 1, wherein a phase compensation is applied to said velocity signal or said deceleration, characteristics of said filter section and said gain section are varied based on a phase-compensated signal.

8. An electric power steering apparatus according to claim 1, wherein said deceleration is a brake stroke calculated by using brake relevant signals obtained from a CAN.

9. An electric power steering apparatus according to claim 1, wherein said resonance frequency band is 15-20 Hz, said resonance frequency band is included in a damping range of said filter section, said filter section does not have a damping characteristic equal to or less than 10 Hz when said vehicle is not said deceleration, and said filter section has a damping characteristic corresponding to said deceleration equal to or less than 10 Hz when said vehicle is said deceleration.

10. An electric power steering apparatus according to claim 1, wherein said filter section comprising a high-pass filter unit and a low-pass filter unit which are stored in a calculation processing unit, and said high-pass filter unit and said low-pass filter unit are switched based on said deceleration as a trigger.

* * * * *